_US006091891A_

United States Patent [19]
Overall et al.

[11] Patent Number: 6,091,891
[45] Date of Patent: *Jul. 18, 2000

[54] METHOD AND APPARATUS FOR CALIBRATING DELAY LINES TO CREATE GRAY LEVELS IN CONTINUOUS TONE PRINTING

[75] Inventors: Gary Scott Overall; Thomas Campbell Wade, both of Lexington, Ky.

[73] Assignee: Lexmark International, Inc., Lexington, Ky.

[*] Notice: This patent issued on a continued prosecution application filed under 37 CFR 1.53(d), and is subject to the twenty year patent term provisions of 35 U.S.C. 154(a)(2).

[21] Appl. No.: 08/853,687

[22] Filed: May 9, 1997

[51] Int. Cl.$^7$ ........................................................ B41J 2/52
[52] U.S. Cl. ............................ 395/112; 358/455; 347/251
[58] Field of Search ................................ 395/112; 347/40, 347/131, 251, 254; 358/448, 455; 702/79, 176

[56] References Cited

U.S. PATENT DOCUMENTS

| | | | |
|---|---|---|---|
| 4,084,196 | 4/1978 | Tisue et al. | 358/283 |
| 4,544,264 | 10/1985 | Bassetti et al. | 355/14 R |
| 4,554,594 | 11/1985 | Ciardiello et al. | 358/283 |
| 4,625,222 | 11/1986 | Bassetti et al. | 346/160 |
| 4,681,424 | 7/1987 | Kantor et al. | 355/14 R |
| 4,786,976 | 11/1988 | Takao et al. | 358/283 |
| 4,811,115 | 3/1989 | Lin et al. | 358/283 |
| 4,891,714 | 1/1990 | Klees | 358/456 |
| 4,918,690 | 4/1990 | Markkula, Jr. et al. | 370/94 |
| 4,924,509 | 5/1990 | Yokomizo | 382/50 |
| 4,972,502 | 11/1990 | Katsuta et al. | 382/56 |
| 4,975,786 | 12/1990 | Katayama et al. | 358/459 |
| 4,984,283 | 1/1991 | Sakano | 382/28 |
| 5,055,943 | 10/1991 | Kishida | 358/459 |
| 5,111,194 | 5/1992 | Oneda | 340/793 |
| 5,121,195 | 6/1992 | Seki et al. | 358/448 |

(List continued on next page.)

*Primary Examiner*—Andrew W. Johns
*Attorney, Agent, or Firm*—Ronald K. Aust; Frederick H. Gribbell

[57] ABSTRACT

An improved printer is provided which includes a series of analog delay elements that operate at a very fast speed, and therefore, can be used in an enhanced mode to further subdivide the slice clock to create a greater variety of gray levels that can be used in continuous tone printing. By using this enhanced mode of continuous tone printing, a full "on" slice can be immediately preceded or followed by a partial slice, under the control of the series of delay elements. The delay elements are automatically calibrated at the beginning of each page to be printed by placing the delay line chain circuit into a "calibrate mode," during which time a clock pulse is provided to the delay line chain so that the chain is repeatedly tested, in increments of one additional delay element at a time, to determine the number of delay elements that are required to cause a time delay that is greater than or equal to the period of the slice-based clock. Once that quantity is determined, the calibrated delay elements will be used to print the entire next page to be output from the laser printhead. As the printer desires various gray levels for continuous tone printing, the number of whole slices and partial slices for a particular pel or group of pels will be determined by the desired gray level, and when a partial slice is to be printed, the printer will select the appropriate number of delay elements that will be used to control a flip-flop that outputs the "video output" signal to the laser printhead. When the asynchronous "reset" input of the flip-flop has a control signal applied, the output of the flip-flop will immediately change state to truncate the "on time" of the slice that was currently being output to the laser printhead. By use of the asynchronous reset flip-flop, the slice can be subdivided into smaller time intervals, completely under the control of the delay line chain without regard to the frequency or phase angle of the pel clock or the slice-based clock.

28 Claims, 6 Drawing Sheets

U.S. PATENT DOCUMENTS

| | | | |
|---|---|---|---|
| 5,134,495 | 7/1992 | Frazier et al. | 358/298 |
| 5,148,287 | 9/1992 | Kemmochi et al. | 358/298 |
| 5,198,910 | 3/1993 | Ng et al. | 358/456 |
| 5,235,432 | 8/1993 | Creedon et al. | 358/479 |
| 5,301,039 | 4/1994 | Tanioka | 358/457 |
| 5,317,419 | 5/1994 | Koizumi | 358/462 |
| 5,331,342 | 7/1994 | Shimatani et al. | 346/108 |
| 5,337,162 | 8/1994 | Sakano | 358/458 |
| 5,343,283 | 8/1994 | van Dorsselaer et al. | 358/445 |
| 5,351,137 | 9/1994 | Kato et al. | 358/457 |
| 5,361,142 | 11/1994 | Semasa | 358/455 |
| 5,379,126 | 1/1995 | Seto et al. | 358/456 |
| 5,404,233 | 4/1995 | Nagata et al. | 358/447 |
| 5,436,736 | 7/1995 | Shono | 358/456 |
| 5,488,487 | 1/1996 | Ojima et al. | 358/456 |
| 5,600,352 | 2/1997 | Knierim et al. | 347/40 |

METHOD AND APPARATUS FOR CALIBRATING DELAY LINES TO CREATE GRAY LEVELS IN CONTINUOUS TONE PRINTING

TECHNICAL FIELD

The present invention relates generally to enhancing the number of gray levels in printing equipment and is particularly directed to a printer of the type which uses delay elements that essentially act as a higher speed clock. The invention is specifically disclosed as an enhanced laser printer that provides a group of in-series delay stages that are capable of subdividing the slice clock pulse so as to create more gray levels than are otherwise available, and a method for calibrating the amount of time delay introduced by each delay stage.

BACKGROUND OF THE INVENTION

As print resolutions increase in electrophotographic-based (EP) printers, print smoothing methods may have less effect on perceived print quality. As print standards move closer to camera ready copy, EP printers are typically forced to make a crucial tradeoff between image definition and smoothness. To achieve a sharper more clearly defined image, each halftone cell must occupy only a small absolute area, corresponding to a small grid of printed pels. To achieve a smooth and gradual transition in gray levels, as are required for lifelike fleshtones, each halftone cell must contain a high number of available gray levels from which to choose. Additionilly, for binary printing where one bit of information represents a black or white pel, the user must choose between image definition and smoothness.

Multi-bit or continuous tone (contone) printing avoids the difficult tradeoff between definition and smoothness by providing multiple levels of control per printed pel. By allowing the image generation software to select multiple intermediate levels, the number of printable gray levels in a given region is greatly increased. For example, given a halftone cell comprised of a 4×4 array of pels, seventeen levels of gray $\{(4*4)+1=17\}$ are possible, including white and black. However, if each pel in this halftone cell can be further divided into four subdivisions, then 65 levels of gray $\{(4*4*4)+1=65\}$ are possible, and by providing more subdivisions per pel, the effective resolution of the printer is increased.

In an effort to increase perceived print resolution, printer hardware designs have focused on methods to divide each printed pel into successively smaller pieces called slices. The increase in division of the pels has typically been achieved by increasing the frequency at which the slice-based clock runs, thereby providing more slices per pel. This method is achievable for standard ASIC silicon processes for 300 dpi printing and 600 dpi printing on slow to medium process-speed printers (e.g., 16 pages per minute (PPM) or less). However, on faster 600 dpi printers and on 1200 dpi and above printers, the clock frequency required to divide each pel into many slices becomes prohibitively last. For example, to divide a 1200 dpi pel into eight slices at 12 PPM would require a slice-based clock frequency of about 320 MHz, which is simply beyond the practical upper limit achievable in today's commodity ASIC silicon processes.

Since traditional synchronous or clock-based methodologies cannot provide the required level of performance, the hardware must be designed to use asynchronous design techniques. One such technique involves the use of analog delay lines, but this implementation is difficult in practical application, due to the variability in the delay produced by a given delay element. In a standard commodity ASIC, the time delay obtained at a desired setting can vary by a factor of three to four times with respect to all variations in silicon processing, ambient temperature, and power supply voltages. This variability must be greatly reduced before the use of delay lines in conventional circuits is practical in providing increased print resolution.

A separate custom delay line module could be used to provide repeatable delay times that could be used to further subdivide a slice. Alternatively, the use of analog pulse width techniques could be useful in an EP printer system, perhaps by using a separate analog pulse width generation device such as a pulse width modulator chip, part number AD9560, manufactured by Analog Devices, or a programmable pulse generator, part number DS1040, manufactured by Dallas Semiconductor.

Other methods of using delay elements in image processing systems or in printers are disclosed in patents, such as U.S. Pat. No. 5,379,126 (by Seto), which discloses an image processing system having high tone quality. A master clock signal is synchronized with an eight-bit image input signal. Using latches and delay circuits, the density level value of the image signal can be modified. This is done by weighting certain bits by the delay time of one or more delay clocks, and also the number of tones per input image signal. In one embodiment, four different delayed clock signals, each having a phase different from the master clock, are used to drive a "changeover" circuit that accepts the image signal as an input along four different parallel lines output from a latch circuit. These parallel image signals are combined with the clock signals to provide a weighted tone signal for each byte of image data. The phase angles of the four different "sub-pel" clock signals are fixed by a set of pre-determined time delay elements.

U.S. Pat. No. 5.351,137 (by Kato) discloses a pixel density converting system for pixel density of an image that includes pseudo halftone processed images and characters or line drawings in a mixed state. The pixel density can either be increased or decreased by various methods that are disclosed in this patent. In some cases, the image signal is sent through line buffers, and then through delay flip-flop elements that are clocked by an image clock. In the illustrated embodiments, the "D" flip-flops are grouped in rows of four and columns of four, to provide a precision of sixteen (16) pixels that can be referred to.

U.S. Pat. No. 5,488,487 (by Ojima) discloses an image forming system for use with laser printers that inputs a signal that becomes subject to pulse-width modulation at a time period that is shorter than the period of the main clock signal. The input signal is converted into a plurality of different signals each having a length of time shorter than the clock signal, thereby performing pulse-width modulation according to a predetermined weighting. Highly toned signals can be obtained without increasing the frequency of the clock signal. In the first embodiment, a single ninety degree phase delay circuit is provided, thereby creating a quadrature clock. In the second embodiment, the pulse-width modulation weighting is not equally divided, but instead the time delay is adjusted by non-uniform increments. Ojima states that, "as long as stable operation of the changeover circuit elements is assured, the present invention is not limited as to the number of delay clock signals and the phase differences among them." This "stable operation," of course, assumes that the time delay circuits themselves will not change operating characteristics over various conditions.

U.S. Pat. No. 4,681,424 (by Kantor) discloses an EP printer that uses an "environmental control signal" (ECS) to determine the overall gray exposure for a particular pel to be printed. Both the leading and trailing edges of the pel can be shifted in time, so as to be compensated for changes in environmental conditions. A delay line circuit has five separate outputs that are connected to a series of selector circuits. A set of comparators have their output states controlled by the voltage level of the current environmental control signal. The outputs of these comparators control how much delay will be used on the trailing edge of a black pel, to increase its overall width. Similarly, the outputs of these comparators also determine the timing of the leading transition of the same pel. The delay line produces a set of progressively delayed pulses with respect to the original clock signal, and the compensation for environmental conditions automatically chooses which of the delay line outputs will be used based upon the analog voltage of the ECS signal.

U.S. Pat. No. 4,625,222 (by Bassetti) discloses print enhancement circuits for an EP printer that modify the drive signals for the printhead. Modifications include smoothing the digitized edges of slanted lines, broadening single pel width lines in the direction perpendicular to the scan direction as well as in the direction parallel to the scan. The circuits disclosed use shift registers and variable time delay elements as delay lines to change the density of gray signals used for pels. Leading and trailing edge gray signals are provided next to black data in a direction parallel to the scan while expanded black signals are provided for the single pel data in a direction perpendicular to the scan. Depending upon the mode of operation, the black and gray signals may both be passed, or if a single pel area contains two gray signals only the leading gray signal is passed, or if a single pel area contains two added black signals and a gray signal, only the gray signal is passed (there are several variations disclosed).

U.S. Pat. No. 4,544,264 (by Bassetti) discloses a similar circuit as in Bassetti '222 in that it discloses delay circuits for producing leading or trailing black signal information to broaden the width of a single pel. In general, a gray pel is always added on one edge of a black line, and this disclosure shows the gray pel always being added adjacent the trailing edge of the black line. Bassetti '264 inhibits gray pels at places where black pels are also being added in the same location.

SUMMARY OF THE INVENTION

Accordingly, it is a primary object of the present invention to provide a printer that exhibits a greater resolution than is available simply by utilizing a slice clock, by use of a series of analog delay elements to increase the number of gray levels in continuous tone printing.

It is another object of the present invention to provide a printer that includes a series of analog delay lines that further subdivide a slice clock to create more gray levels in continuous tone printing, and to calibrate the timing of these delay elements so as to render a repeatable visual resolution in the printed output even under varying conditions under which the delay elements operate.

It is a further object of the present invention to provide a printer that includes a series of analog delay elements to further subdivide the slice clock so as to create more gray levels in continuous tone printing, and to virtually eliminate all effects of pulse width variability usually associated with asynchronous design.

It is yet another object of the present invention to provide a printer that can calibrate in real time the actual time delay of a series of delay elements that are used to effectively further subdivide the slice clock to create more gray levels in continuous printing, in which this calibration automatically determines how many delay elements comprise the period of the slice clock.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved printer is provided which includes a conventional pel clock and a conventional slice (or sub-pel) clock to create an initial print resolution. In addition, the printer of the present invention provides a series of analog delay elements that operate at a very fast speed, and therefore, can be used in an enhanced mode to further subdivide the slice clock to create a greater variety of gray levels that can be used in continuous tone printing. By using this enhanced mode of continuous tone printing, a full "on" slice can be immediately preceded or followed by a partial slice, under the control of the series of delay elements. In one disclosed embodiment, the pulse output that is provided to the laser printhead is also directed into a delay line chain (e.g., an in-series group of delay stages) which have individual outputs directed into a multiple-input multiplexer, which is used to select the appropriate number of delay elements that will be used to subdivide one of the slices as that slice is being output in real time to the laser printhead. In another disclosed embodiment, the pulse output to the laser printhead is directed into a chain of individual delay stages which each comprise a delay line element and a dual-input multiplexer. Each of the dual-input multiplexers is controlled so as to either input a delayed pulse that has traveled through at least one delay line element or to input a buffered pulse derived from the "video output" signal being sent to the laser printhead.

In both disclosed embodiments, the delay line chain is composed of electronic components residing in the print engine's ASIC (Application Specific Integrated Circuit), and the delay elements can be automatically calibrated at the beginning of each page to be printed. This is accomplished by placing the delay line chain circuit into a "calibrate mode," during which time a clock pulse is provided to the delay line chain so that the chain is repeatedly tested, in increments of one additional delay element at a time, to determine the number of delay elements that are required to cause a time delay that is greater than or equal to the period of the slice-based clock. Once that quantity is determined, the calibrated delay elements will be used to print the entire next page to be output from the laser printhead.

As the printer desires various gray levels for continuous tone printing, the number of whole slices and partial slices for a particular pel or group of pels will be determined by the desired gray level, and when a partial slice is to be printed, the printer will select the appropriate number of delay elements that will be used to control a flip-flop that outputs the "video output" signal to the laser printhead. This occurs by virtue of the fact that this flip-flop has an asynchronous "reset" input, and when that input has a control signal applied, the output of the flip-flop will immediately change state to truncate the "on time" of the slice that was currently being output to the laser printhead. By use of the asynchronous reset of the flip-flop, the slice can be subdivided into smaller time intervals, completely under the control of the delay line chain without regard to the frequency or phase angle of the pel clock or the slice-based clock.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
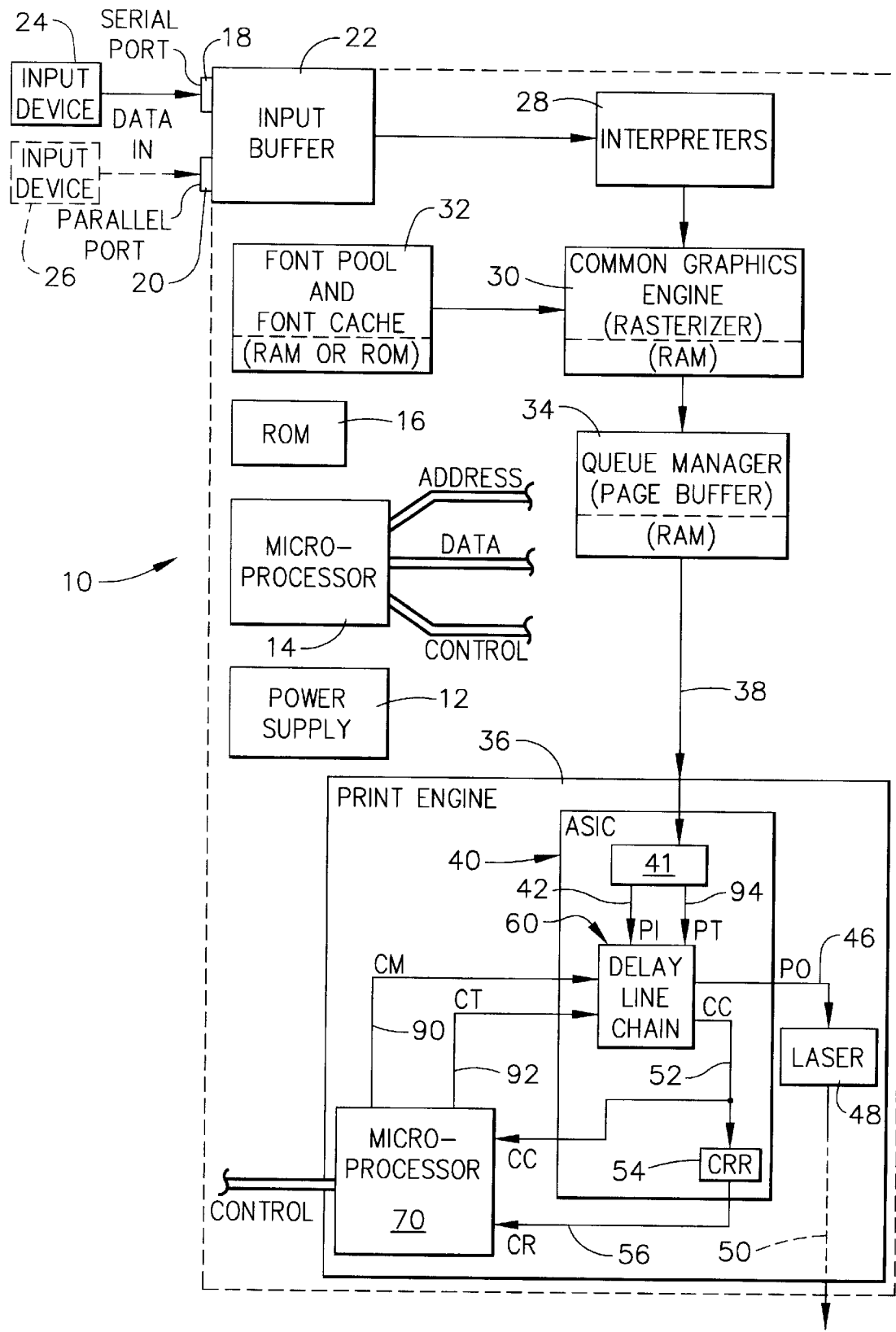
FIG. 1 is a hardware block diagram of the major components used in a laser printer, constructed according to the principles of the present invention.

Referring now to the drawings, FIG. 1 shows a hardware block diagram of a laser printer generally designated by the reference numeral 10. Laser printer 10 will preferably contain certain relatively standard components, such as a DC power supply 12 which may have multiple outputs of different voltage levels, a microprocessor 14 having address lines, data lines, and control and/or interrupt lines, Read Only Memory (ROM) 16, and Random Access Memory (RAM), which is divided by software operations into several portions for performing several different functions.

Laser printer 10 also contains at least one serial input or parallel input port, or in many cases both types of input ports, as designated by the reference numeral 18 for the serial port and the reference numeral 20 for the parallel port. Each of these ports 18 and 20 would be connected to a corresponding input buffer, generally designated by the reference numeral 22 on FIG. 1. Serial port 18 would typically be connected to a serial output port of a personal computer or a workstation that would contain a software program such as a word processor or a graphics package or computer aided drawing package. Similarly, parallel port 20 could be connected to a parallel output port of the same type of personal computer or workstation containing the same types of programs. Such input devices are designated, respectively, by the reference numerals 24 and 26 on FIG. 1.

Once the text or graphical data has been received by input buffer 22, it is commonly communicated to one or more interpreters designated by the reference numeral 28. A common interpreter is PostScript™, which is an industry standard used by most laser printers. After being interpreted, the input data is typically sent to a common graphics engine to be rasterized, which typically occurs in a portion of RAM designated by the reference numeral 30 on FIG. 1. To speed up the process of rasterization, a font pool and possibly also a font cache is stored, respectively, in ROM or RAM within most laser printers, and these font memories are designated by the reference numeral 32 on FIG. 1. Such font pools and caches supply bitmap patterns for common alphanumeric characters so that the common graphics engine 30 can easily translate each such character into a bitmap using a minimal elapsed time.

Once the data has been rasterized, it is directed into a queue manager or page buffer, which is a portion of RAM designated by the reference numeral 34. In a typical laser printer, an entire page of rasterized data is stored in the queue manager during the time interval that it takes to physically print the hard copy for that page. The data within the queue manager 34 is communicated in real time to a print engine designated by the reference numeral 36. Print engine 36 includes a laser light source within the printhead 48, and its output 50 is the physical inking onto a piece of paper, which is the final print output from laser printer 10.

It will be understood that the address, data, and control lines are typically grouped in buses, which are electrically conductive pathways that are physically communicated in parallel (sometimes also multiplexed) around the various electronic components within laser printer 10. For example, the address and data buses are typically sent to all ROM and RAM integrated circuits, and the control lines or interrupt lines are typically directed to all input or output integrated circuits that act as buffers.

Print engine 36 contains an ASIC (Application Specific Integrated Circuit) 40, which acts as a controller and data manipulating device for the various hardware components within the print engine. The bitmap print data arriving from Queue Manager 34 is received by ASIC 40, and at the proper moments is sent to the laser printhead 48.

As the rasterized bitmap information is presented to print engine 36 along data path 38, it will eventually be serialized so that it may be communicated to the laser printhead 48 to produce the necessary dots to create a print output 50. An image processing circuit 41 will inspect the incoming data from data path 38 and will create a serial slice-based signal "PI" at data path 42 and a subslice "Print Truncation Select" signal "PT" at data path 94. The serialized signal PI on data path 42 is also referred to herein as the "Pulse Input" signal. After being operated on by a delay line chain line 60, a Pulse Output signal (or "PO") signal, designated by the reference numeral 46, represents the "video output" serialized signal that drives the laser printhead 48.

Two separate embodiments for delay line chain 60 are disclosed herein, and both embodiments use certain common signals that are depicted on FIG. 1. A separate microprocessor 70 is provided within the print engine hardware, and controls some of the important decisions made to properly operate delay line chain 60. For example, microprocessor 70 outputs a "Calibrate Mode" signal (i.e., "CM") along a signal path 90, that will place delay line chain 60 into a mode that calibrates the amount of time that transpires in the individual delay stages, as discussed more completely hereinbelow.

Another important signal controlled by microprocessor 70 is a "Calibrate Truncation Select" signal ("CT") along signal path 92. The signal CT is used in the appropriate circumstances to select the number of delay stages that will be used in delay line chain 60.

Microprocessor 70 also receives signals from ASIC 40, including a "Calibrate Complete" signal ("CC") that is output from delay line chain 60 along a signal path 52, and is communicated both to microprocessor 70 and to a "Calibration Result Register" (or "CRR") 54. This CRR register 54 is used to store the result of the most recent calibration procedure that was performed by delay line chain 60, and this result represents the number of delay stages that were required to produce a sufficient time delay to traverse one entire period of the slice clock. This result is typically provided as a binary number having the variable name "CR" that is an integer having a maximum value of fifteen (15) in the preferred embodiment, representing a maximum of fifteen (15) delay stages provided in delay line chain 60. The CR signal is communicated from the CRR register 54 along a signal path 56 to microprocessor 70.

Figure 2:
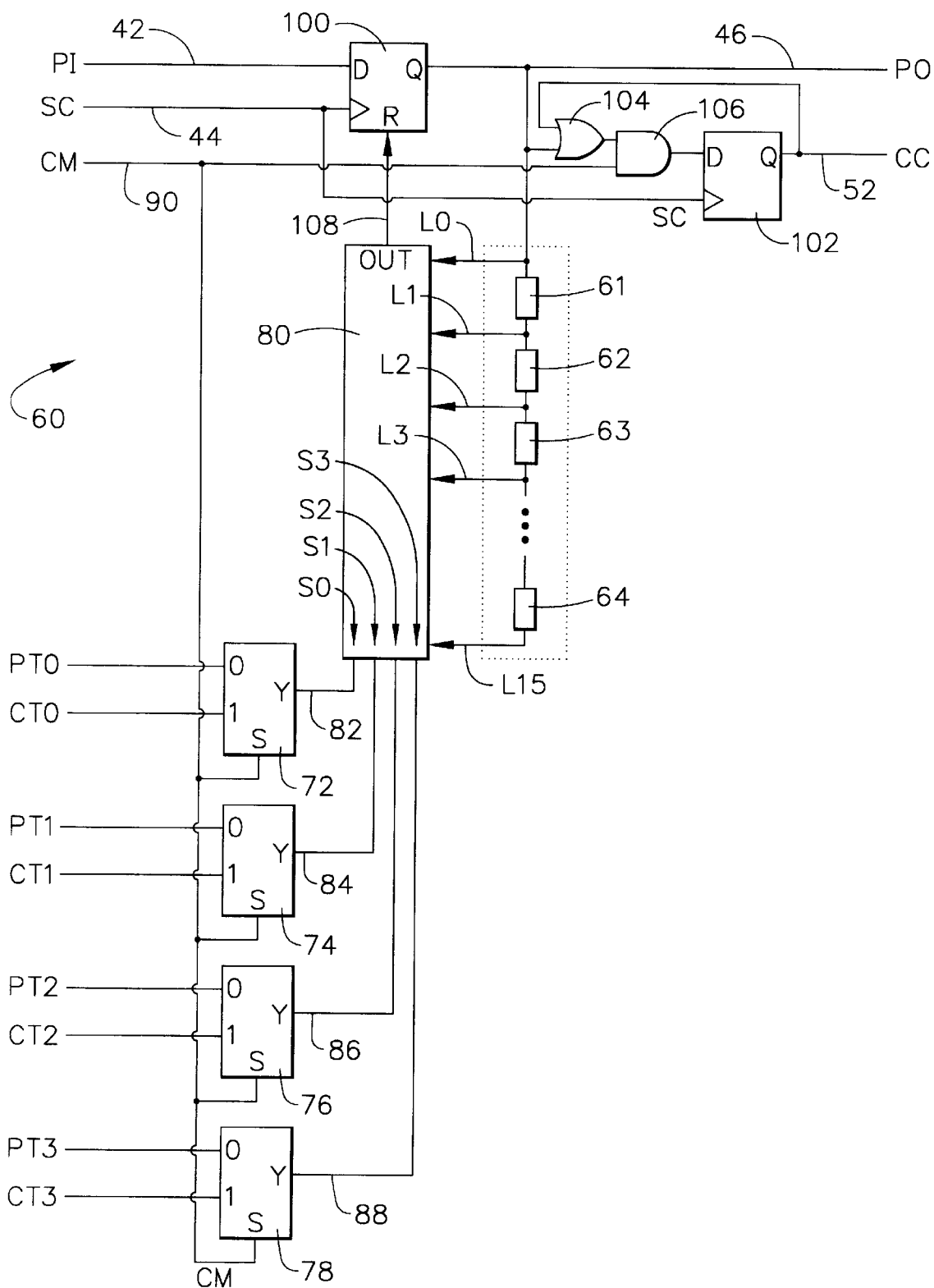
FIG. 2 is a block diagram in partial schematic of an electronic circuit used in a first embodiment of a delay line chain and multiple-input multiplexer combination that is used to further subdivide the output pulses provided to the laser printhead of the printer of FIG. 1 at moments that do not correspond to a transition of the slice-based clock.

FIG. 2 depicts a first embodiment of delay line chain 60, in which a series of delay elements 61, 62, 63, and 64 (and other delay elements not shown) have outputs directed into a multiple-input multiplexer 80. Assuming a laser printer having a pel size of 1/600 inches (i.e., 600 dpi), and a slice size of 1/8 pel, it would be appropriate to use a slice clock running at 170 MHz. Such a printer could produce twenty-four (24) pages per minute (PPM), and the time period for a single slice would be 5.8 nsec. Since commodity ASIC silicon processes allow a maximum clock speed of about 200 MHz, it would be impossible to further subdivide the slice using a clock-type approach to achieve a greater resolution to create a higher number of gray levels.

By instead using analog delay lines (depicted in FIG. 2 as delay elements 61, 62, 63, and 64), one of the outputs from the delay lines, designated by the signals L0, L1, L2, L3, or L15 are input to the multiple-input multiplexer 80 (also referred to herein as the "Master MUX"). One of these outputs L0–L15 will be switched to the output of multiplexer 80, and the output signal will be directed along a signal path 108 into an asynchronous reset input of a flip-flop 100. When the output from Master MUX 80 is driven to a Logic 1 state, the asynchronous reset of flip-flop 100 will drive its Q output immediately to Logic 0. In this manner, if flip-flop 100 was currently outputting a Logic 1 pulse (representing a slice to be printed by the laser printhead), the asynchronous reset would cause the slice to be truncated, and only a portion of that slice would actually be printed by the laser printhead.

The serial bitmap data arrives on FIG. 2 at the PI (Pulse In) input at signal path 42. At the beginning of the slice-based clock period, the SC clock signal will make a transition to Logic 1 at signal path 44 which. when received at flip-flop 100, will drive the flip-flop's Q output to the logic state then present at its D input. A transition in the PI signal that occurs nearly simultaneously with a transition in the slice-based clock SC signal will not effect a transition at the Q output until the next period of the SC clock. This is so because of the inherent propagation delay in which the transition by the PI input will not take effect until after the SC clock pulse has already caused flip-flop 100 to inspect its D input, and perhaps alter its Q output state. In this manner, the PO (Pulse Out) signal at signal path 46 will not immediately follow the PI signal, but will be delayed by a single period of the SC clock.

Assuming that laser printhead 48 is to print an entire slice, then the "Master MUX" 80 will simply command its output at signal path 108 to be at Logic 0, thereby not resetting the output of flip-flop 100. This will have the effect of not truncating the PO output pulse, so that it may remain in a Logic 1 state for the entire SC clock period (i.e., for the entire slice).

Since delay lines available in commodity silicon ASIC's have a time delay variability on the order of three to four times their nominal delay times, these devices have been impractical in operating as a reliable mechanism with any repeatability to provide a greater resolution compared to a single period of a slice-based clock. Left unchecked, this uncontrolled variability would be detrimental to the overall printer's performance. For example, if an end user printed one hundred copies of an image, the last printout might be significantly darker than the first page printed, since the slowing of the delay lines as the printer warms up would keep the laser on longer for each pel printed through the delay elements. Since electrons flow faster through cool silicon, the effect of a given number of delay elements will be less when the printer is cooler; however, by the time the final page is printed in this example, the silicon of the ASIC will be quite warm, thereby considerably slowing the delay lines. When the final page is printed, the slow delay lines would extend the duration of the pulse to the laser, thereby making the last page printed noticeably darker than the first page.

The present invention virtually eliminates all pulse width variability typically associated with asynchronous circuit designs by periodically calibrating the delay lines in real time to avoid the problems described above. The resulting system allows the image control software to grow the size of a laser spot in increments of about 1.2 nsec in a typical office-temperature environment. Even greater accuracy could be obtained by decreasing the size of each delay element while increasing the total elements in the chain.

The ability to perform a real time calibration is implemented in the first embodiment of FIG. 2 by providing a "calibrate mode" of operation and a "print mode" of operation. The print mode of operation is effected when the CM signal at signal path 90 is set to Logic 0. At this logic state, the CM signal will "select" the "0" input at each of a series of dual-input multiplexers 72, 74, 76, and 78, by having their "Select" inputs set to Logic 0. In this operating state, the signals designated "PT0", "PT1", "PT2", and "PT3" are transferred to the "Y" output of each of these multiplexers. The logic states of the variables PT0–PT3 are thereby transferred, via signal paths 82, 84, 86, and 88, to the four "Select" inputs S0, S1, S2, and S3 of the Master MUX 80. Using these four digital signals, a total of sixteen (16) different logic states can be selected with regard to the switching of Master MUX 80, which enables Master MUX 80 to select from a total of sixteen possibilities at its inputs. For example, if a particular slice is to be truncated after a time delay period equivalent to only two (2) delay stages, then the Master MUX 80 would cause its input at the signal path L2 to be connected to its output at 108, thereby causing a pulse to travel from the PO data path 46, through delay stage 61 and delay stage 62, through the input at signal path L2, through the output of Master MUX 80, and finally through the signal path 108 to actuate the asynchronous reset of flip-flop 100. When this occurs, the Q output of flip-flop 100 will immediately make a transition from Logic 1 to Logic 0.

Of course, it is important to know exactly how much time delay will be introduced when one or more delay stages are selected. Therefore, it is important to calibrate the amount of time required for a pulse to travel through each of the delay stages 61–64. As can be seen in FIG. 2, it will be understood that there are several more delay stages to be placed between the delay stage 63 and the delay stage 64, as represented by the triple dots on the figure. In the illustrated embodiment of FIG. 2, fifteen (15) delay stages are provided; however, as related above, the number of delay stages can be increased to whatever length is desired without departing from the principles of the present invention.

To calibrate the delay stages 61–64, the CM signal is caused to become Logic 1 by microprocessor 70. When this occurs, each of the dual-input multiplexers 72, 74, 76, and 78, will have their Y outputs connected to their "1" inputs, which are connected to signal paths "CT0", "CT1", "CT2", and "CT3". At the same time, a Logic 1 signal is placed at one of the inputs of an AND-gate 106.

The calibration procedure starts with no delay stages being selected, which is accomplished by causing the variables CT0–CT3 to all be set to Logic 0, which then causes the Select inputs of Master MUX 80. (i.e., inputs S0–S3) to all be set to Logic 0. Under this condition, the input at L0 will be selected by Master MUX 80 and connected to its output. A Logic 1 pulse is introduced at PI at signal path 42, which will cause flip-flop 100 to drive its Q output to Logic 1 upon the next positive transition of the slice-based clock SC at 44. When that occurs, the Q output will transition to Logic 1, thereby causing a positive transition to occur at the L0 input of Master MUX 80. This will eventually cause a Logic 1 transition to occur at signal path 108, thereby toggling the asynchronous reset of flip-flop 100, and driving its Q output back to Logic 0. Generally speaking, this procedure should look much like the timing diagram depicted in FIG. 6 (except the pulse-width between transitions 358 and 360 should be much shorter), unless there is some severe time delay being introduced somewhere in the circuit that causes the positive transition at signal path 108 to not occur until after the end of a complete period of the slice-based clock SC signal. If that should occur, then it would become immediately apparent to the circuit that it would be impossible to further subdivide the slice-based clock under these conditions, and the delay line chain would not be used until the situation is corrected.

Figure 6:
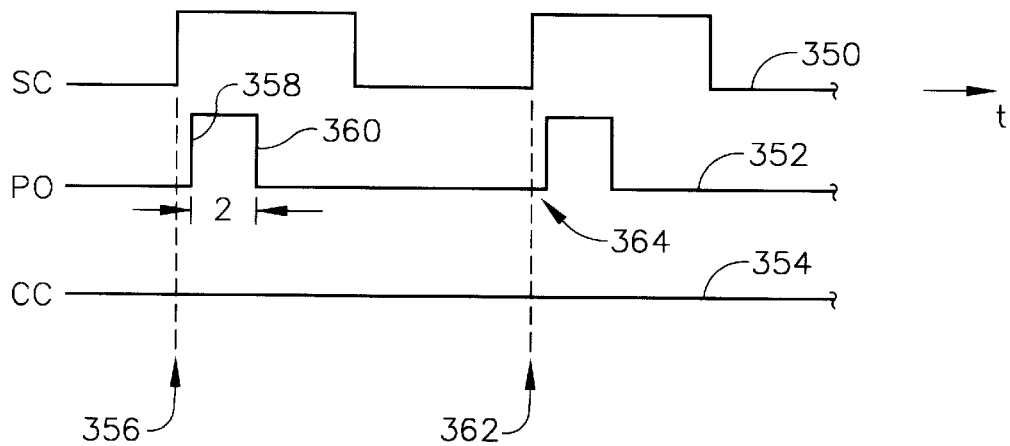
FIG. 6 is a timing diagram of the appropriate signals used in a calibration mode of the printer of FIG. 1, in which the delay line chain provides only a two-element delay.

Referring to FIG. 6, the slice-based clock SC signal has its waveform depicted at reference numeral 350. The output pulse signal PO has its waveform depicted at reference numeral 352, where it can be seen that its leading edge positive transition at 358 does not occur until a certain amount of time after the positive transition of the SC clock, at the numeral 356 on the time axis. As related above, this is due to the propagation delay through the flip-flop 100. On FIG. 6, the PO signal will stay at Logic 1 for two (2) delay stage time intervals, and then falls back to Logic 0 at reference numeral 360. As shown in FIG. 6, this negative transition occurs much earlier than the beginning of the next slice-based clock period at reference numeral 362. Because of this fact, the PO signal will be at Logic 0 at the critical moment designated by the reference numeral 364 which occurs on the time axis at numeral 362. Because of that fact, the CC ("Calibration Complete") signal will remain at Logic 0, as shown on the waveform at reference numeral 354.

Figure 7:
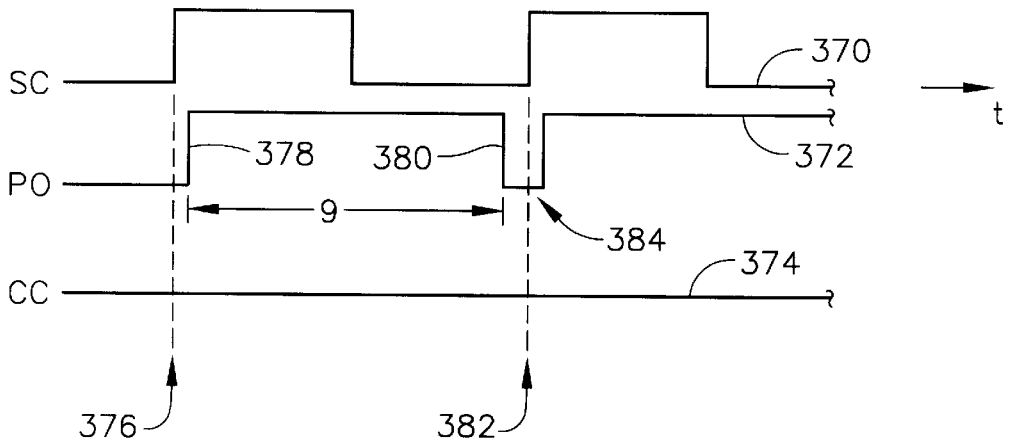
FIG. 7 is a timing diagram of the appropriate signals used in a calibration mode of the printer of FIG. 1, in which the delay line chain provides only a nine-element delay which provides a time delay that is just short of an entire slice clock period.

During the calibration mode, it is preferred to increment by one delay stage for a short time period to test each of the delay stages in succession until the occurrence of enough accumulated delay time occurs that will exceed the period of the slice-based clock signal. As related above, this incremental selection is under the control of the signals CT0–CT3, which will start at a binary value of $0000_2$, and increment up through the binary value of $1111_2$. On FIG. 7, the situation arises in which the calibration procedure is now testing nine (9) of the delay stages. In this circumstance, the PO signal of waveform 372 makes a positive transition at 378, which is just a short amount of propagation delay time after the time mark 376 on the time axis. The SC clock waveform is at 370. After nine delay intervals, the PO signal makes a negative transition at reference numeral 380, which occurs before the time mark 382, which is the beginning of the next positive transition of the SC clock signal. Therefore, at the critical time designated by the reference numeral 384, the PO signal is still at Logic 0, and the CC signal remains at Logic 0, as shown by the waveform 374.

Figure 8:
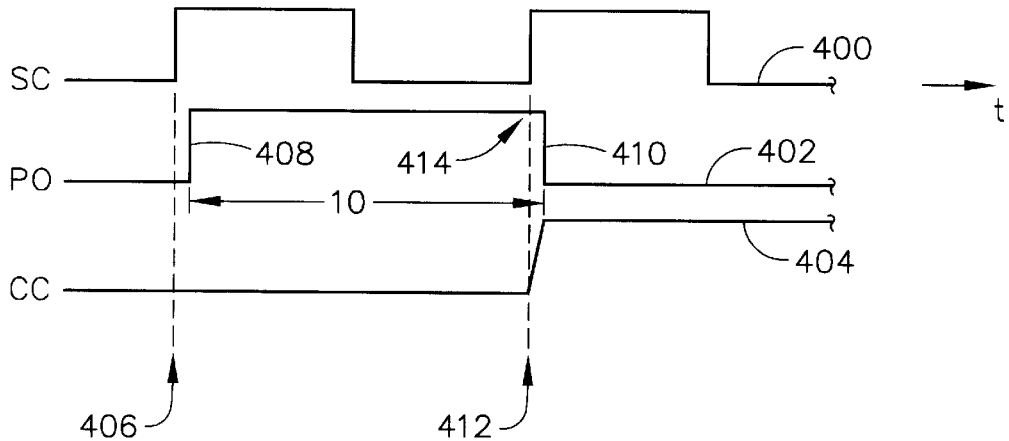
FIG. 8 is a timing diagram of the appropriate signals used in a calibration mode of the printer of FIG. 1, in which the delay line chain provides a ten-element delay, which finally provides enough time delay to traverse an entire period of the slice-based clock.

On FIG. 8, the number of delay stages selected in the calibration mode is finally enough so that the accumulated time delay is greater than a single period of the SC clock. With the SC waveform depicted at reference numeral 400, the PO waveform is at numeral 402. The SC waveform makes a positive transition at the time mark 406, after which the PO waveform makes a positive transition at 408. Now that ten (10) delay stages are involved, the PO signal does not make a negative transition until the waveform reaches the numeral 410. Since the SC clock starts its ;second period at the time mark 412, the critical moment, designated by the reference numeral 414, arrives while the PO signal is still in its Logic 1 state. When this occurs, the PO input to OR-gate 104 will be set to Logic 1 for the first time during this particular calibration procedure. The output of OR-gate 104 drives high the second input of AND-gate 106, which now drives its output to a Logic 1 state. Upon the second transition (on FIG. 8) of the SC clock signal at time mark 412, the flip-flop 102 will drive its Q output to a Logic 1 state (since its D input at 414 is now at Logic 1 at the beginning of the SC transition), and its output signal at reference numeral 52 will inform the microprocessor 70, via the signal CC, that the calibration mode is now complete for this particular procedure. Since the CC signal is also directed back to OR-gate 104, the CC signal latches itself high, and its waveform 404 on FIG. 8 remains at a Logic 1 state even after the PO signal falls back to Logic 0.

If all of the delay stages are included in a calibration procedure, yet nevertheless fail to cause the calibration complete signal CC to become Logic 1, then the microprocessor 70 will know that an error has occurred, and it should not attempt to use the delay line chain for printing under these circumstances. Assuming that an error does not occur, then a numeric value will be placed in the CRR register 54 that is related to the number of delay stages required to create a time delay that transits a single entire period of the slice-based clock SC signal.

It is preferred that the calibration procedure be accomplished at the beginning of each page to be printed by laser printer 10, thereby utilizing to advantage the short amount of time in which actual printing cannot occur (since there is no paper momentarily being presented to the laser printhead). The calibration procedure can be accomplished very quickly, and will not tic down microprocessor 70 unduly while it performs its many other tasks in controlling the print engine 36. A fairly simple software routine can be used to control the calibration procedure, an example of which follows:

---

Set Calibrate Mode input high
Initialize Calibrate Truncation Select to 0
Do  {
    send a test pulse on Pulse In
    increment Calibrate Truncation Select value
    if (Calibrate Truncation Select value > maximum number of valid
        selections then declare a calibration error
    } while (Calibrate Complete is low)
Calibration Value = Calibrate Truncation Select value − 1

---

Figure 5:
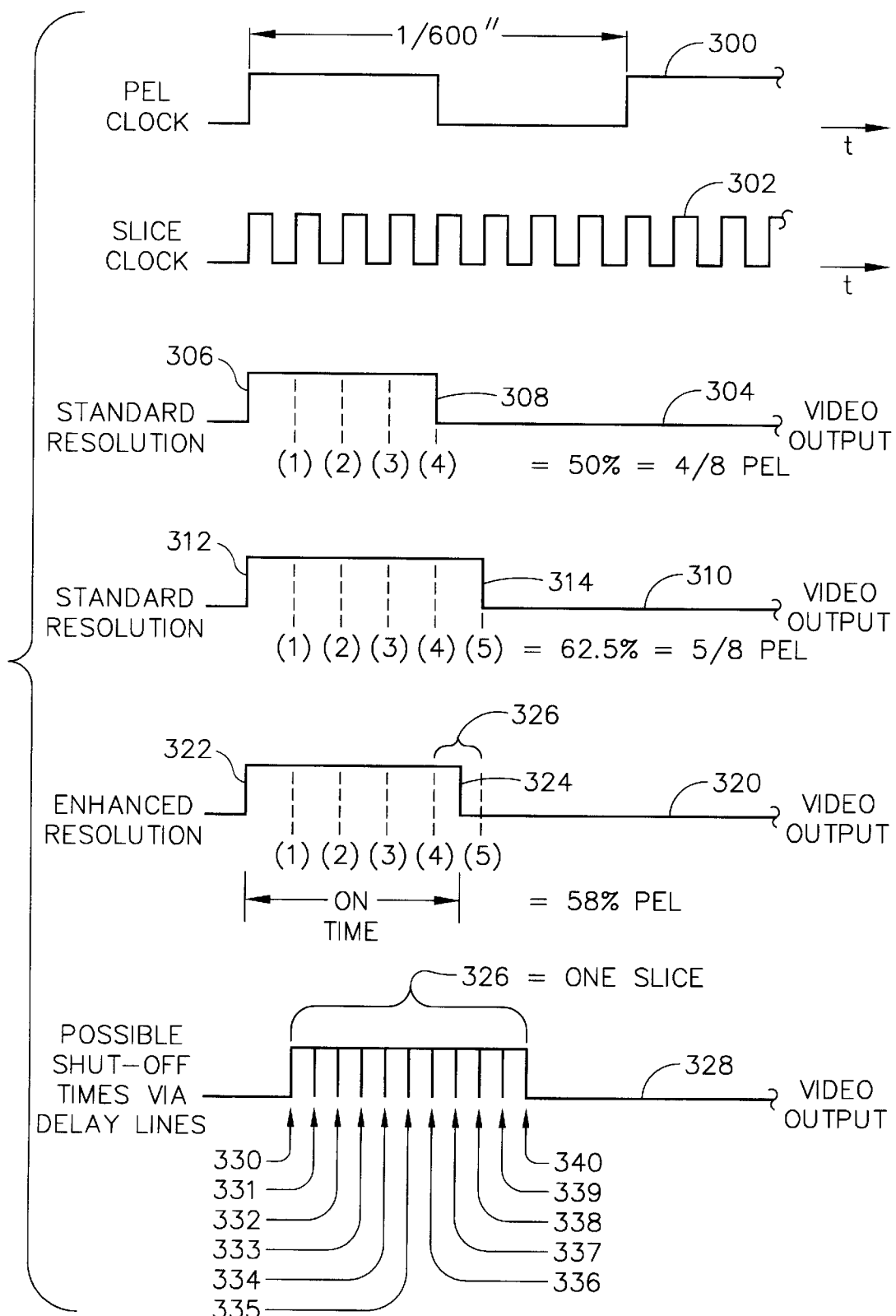
FIG. 5 is a timing diagram showing the pel clock, slice clock, and video output waveforms for both a standard resolution printer and the enhanced resolution printer depicted in FIG. 1.

In the above example, ten (10) delay stages were required to cover a single period of the SC clock. Using that assumption, the waveforms of FIG. 5 can be discussed in the following example: in the situation where the pel clock represents 1/600 of an inch, the pel clock waveform is shown at reference numeral 300. Its corresponding slice clock is depicted by the waveform 302, in which there are eight (8) slices per pel. In a conventional printer having a standard slice-based resolution, the waveform 304 which represents the video output (i.e., equivalent to the variable PO on FIG. 2) in which the gray level is equivalent to 4/8 pel, which is a 50% tone density. This is accomplished by causing the video output to make a positive transition at 306 (at the beginning of the pel clock period) and then making a negative transition at 308, which occurs four slices later.

Using the conventional printer's standard resolution, the next possible gray level is shown on the waveform at reference numeral 310, in which the video output is at Logic 1 for five (5) slices of the pel. The video output's positive transition occurs at 312, and its negative transition occurs at 314, giving a gray level of 5/8 pel or approximately a tone density of 62.5%.

Using the enhanced resolution of the present invention, the waveform 320 depicts a video output that will produce a tone density of approximately 58% of a pel. The video output makes a positive transition at 322, and a negative transition at 324. This negative transition does not occur based upon a transition of the slice-based clock, but instead occurs during the middle of a slice. If the entire slice was to be printed, then the negative transition would not occur until the time mark was reached at the end of the bracket 326. Instead, the waveform 328 shows that there are many possible shut-off times for this single slice 326 by use of the delay line chain. If ten (10) delay stages are equivalent to a single period of the slice clock, then the video output can be commanded to make a negative transition at any one of the time intervals depicted by the reference numerals 330–340.

In the example of the waveform 320, it is desired to create a gray level of approximately 58% of a pel. This can be accomplished by causing the first four entire slices to be printed as Logic 1 values, and then by truncating the fifth slice (represented by the reference numeral 326) so that only a further 8% of the pel is printed, rather than the entire 12.5% of a pel that is represented by a single entire slice. This means that the slice 326 should be truncated somewhere between the sixth and seventh delay stage, and depending upon whether this value is to be rounded up or rounded down, the slice will be truncated at either the reference numeral 336 or 337 on the waveform 328.

It will be understood that the rounding up or rounding down decision can be made by interpolation, or by some other method without departing from the principles of the present invention. To achieve further precision, the number of delay lines could be increased per slice clock period, and this could be accomplished by either slowing the slice clock frequency, or by decreasing the amount of time delay provided by each delay stage of the delay line chain 60.

Figure 3:
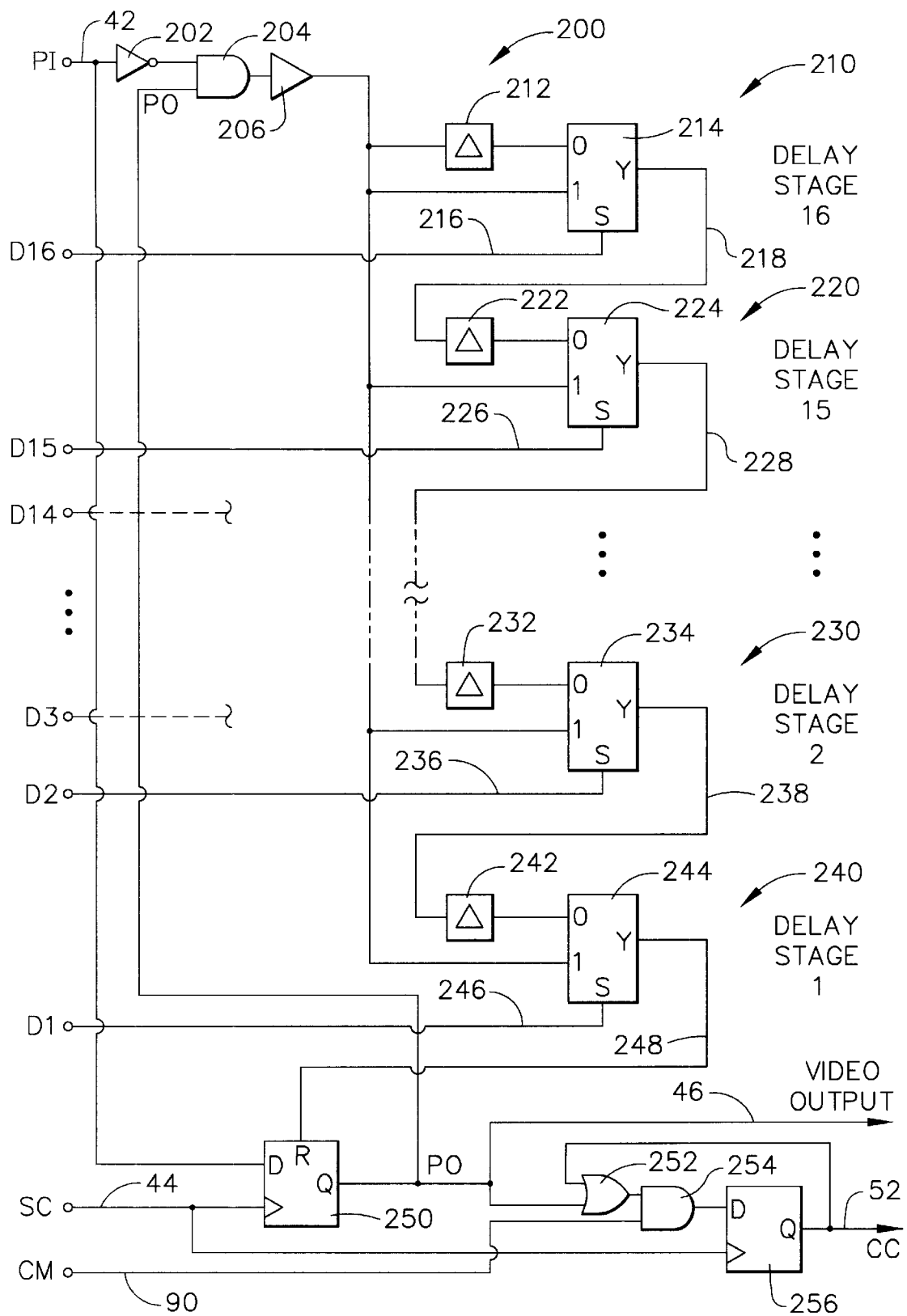
FIG. 3 is a block diagram in partial schematic of an electronic circuit used in a second embodiment of a delay line chain and a series of dual-input multiplexers that are used to further subdivide the output pulses provided to the laser printhead of the printer of FIG. 1 at moments that do not correspond to a transition of the slice-based clock.

FIG. 3 depicts a second embodiment of a delay line chain, generally designated by the reference numeral 200, for use with the present invention. In this second embodiment, each delay stage comprises a delay line element and a dual-input multiplexer, in which one of the inputs for each of these multiplexers is derived essentially directly from the serial pulse input signal that would normally be provided directly to the laser printhead 48 in a conventional printer. Each of these multiplexers can also be individually selected by a series of stage selection signals that are derived from microprocessor 70. This is quite different from the first embodiment depicted in FIG. 2, in which the input pulse (i.e., signal "PO") was fed only to the first stage 61 of the delay line chain, and each of the outputs of the delay stages were fed into a sixteen-input multiplexer (i.e., Master MUX 80). Furthermore, in the first embodiment the Master MUX 80 also received a parallel 4-bit set of binary signals that acted as the MUX "select" signal, so that any of the sixteen inputs could be switched to the Master MUX's output.

Referring back to FIG. 3, the PI input 42 is presented to an inverter 202, and then continues to an AND-gate 204. The other input for AND-gate 204 is the Pulse Output (PO) signal, which under some circumstances is simply a mirror of the PI signal, however, delayed by one slice-clock period. The output of AND-gate 204 is fed to a line buffer 206, which has the output capacity to drive into each of sixteen (16) different dual-input multiplexer chips that are used in the delay line chain of circuit 200. Buffer 206 also drives into the top (on FIG. 3) delay element 212, which then feeds into the "0" input of multiplexer 214.

In FIG. 3, while only four delay stages are actually depicted on this drawing, it will be understood that this embodiment represents a total of sixteen (16) delay stages, in which the delay stages numbered 3–14 are to be connected in an identical fashion as shown for delay stages 2 and 15 (respectively, corresponding to reference numerals 220 and 230).

Delay element 212 and multiplexer 214 make up the primary elements of a "Delay Stage 16", designated by the reference numeral 210. The reason for calling this Delay Stage 16 rather than "Delay Stage 1" will become apparent hereinbelow. Multiplexer 214 also has a "1" input that is directly connected to the output of buffer 206, and further has a "Select" input that is connected to a delay stage select line 216 which carries a signal from an output "D16" that is ultimately derived from microprocessor 70. Depending upon the state of the Select input 216, the output "Y" of multiplexer 214 will be connected either to the 0-input or the 1-input, and an output pulse will be communicated from output "Y" via a signal path 218 to the next delay element 222, which is part of delay stage 220 (also called Delay Stage 15). If each of the delay elements 212, 222, 232, and 242 (as well as the other delay elements not actually shown on FIG. 3) are nominally equal to a 1.2 nsec time delay, it will be understood that a pulse leaving buffer 206 will immediately arrive at the 1-input of multiplexer 214, however, the pulse arriving at the 0-input of multiplexer 214 will, in comparison, be delayed by 1.2 nsec because of delay element 212.

The other delay stages of delay chain 200 have a similar function in which a pulse arriving at the 0-input of a multiplexer will have been delayed by its corresponding delay element, and a pulse arriving at the 1-input of a multiplexer will arrive essentially immediately upon the output of a pulse from buffer 206. The Select input (or "S-input") of each multiplexer will, of course, determine which of the two inputs is to be connected to the Y output, and for delay stage 220, the Select input for multiplexer 224 arrives via a select line 226 from an output D15. The output from multiplexer 224 would travel along signal path 228 to the next delay stage (not shown) which is Delay Stage 14, and its multiplexer would be controlled by a signal D14. This type of circuit arrangement continues until arriving at delay stage 230, in which the output of a (not shown) Delay Stage 3 will be connected to the input of delay element 232, and Delay Stage 3 will have its multiplexer controlled by the output D3.

Multiplexer 234 of delay stage 230 (i.e., Delay Stage 2) has its Select input connected to an output D2 via a signal path 236. Its output is communicated to the next delay element 242 via a signal path 238. The "final" delay stage 240 (i.e., Delay Stage 1) includes delay element 242 and a multiplexer 244. Multiplexer 244 has its Select input connected to an output D1 via a signal path 246, and its output is communicated to a flip-flop 250 via a signal path 248.

Flip-flop 250 acts in a similar manner to flip-flop 100 on FIG. 2. Its D input is connected directly to the PI signal line, and its Q output is directly connected to the PO signal path, which is the video output on signal path 46 that is provided to the laser printhead 48. Flip-flop 250 also has an input connected to the SC clock along the clock line 44, and has its asynchronous reset input connected to the output of a multiplexer, in this case a dual-input multiplexer 244 (rather than the 16-input Master MUX 80 output along signal path 108).

To perform a calibration of delay line chain 200, a CM output from microprocessor 70 is communicated along signal path 90 to an AND-gate 254. At the same time, one of the multiplexer select lines D1–D16 is placed in a Logic 1 state, while the others are placed in a Logic 0 state (all controlled by microprocessor 70). If, for example, the select line D1 is placed into Logic 1, then multiplexer 244 will switch its 1-input to its output Y, and the pulse output of buffer 206 will be directly sent to the Y output of multiplexer 244. When this occurs, a pulse will almost immediately be placed on the signal path 248, delayed only by the propagation delay of multiplexer 244.

It is preferred that the dual-input multiplexers depicted on FIG. 3 be very fast, i.e., have a very short propagation delay between their inputs and their output. However, it should be understood that the delay through the multiplexer elements is factored into the calibration result, so that the accuracy of the technique is not affected by the multiplexer delay. Rather, the amount of delay induced by the multiplexer more significantly affects the size of delay element chosen. In this example, the input pulse PI that initially caused buffer 206 to emit a pulse will also drive into the D input of flip-flop 250. Upon the next positive transition of the slice-based clock SC, the Q output of flip-flop 250 will either remain at Logic 0, or will jump to Logic 1, depending upon whether or not its asynchronous reset was provided with a Logic 1 pulse along signal path 248. In this first example, since there is essentially zero time delay introduced by the delay line chain 200, the reset input of flip-flop 250 will have been almost immediately set to its Logic 1 state, and the Q output of 250 will be been reset to Logic 0 well in advance of the next positive transition of the SC clock (see FIG. 6, except considering that the delay time between the transitions 358 and 360 would be even less).

The calibration procedure would now increment to the "next" delay line level, and would place the output D2 into a Logic 1 state, and return output D1 to a logic zero state so that the output from buffer 206 would be switched through multiplexer 234 to its Y output, and a pulse would appear along signal path 238 almost immediately. This pulse would then be delayed by delay element 242, and multiplexer 244 would transfer that signal, via its 0-input, to its Y output to further communicate that pulse along signal path 248 and to the asynchronous reset of flip-flop 250. It will be understood that a single time delay has now been introduced by Delay Stage 1, by selecting the output D2 in this calibration procedure.

The calibration procedure continues by incrementing the Select Lines from D1 through D16 until the accumulated delay period provided by the in-series delay stages will provide a sufficient time interval that exceeds the period of a single SC clock pulse. When that occurs, the asynchronous reset input of flip-flop 250 will still be at Logic 1 upon the second positive transition of the SC clock at 44, and in that circumstance, the Q of output of flip-flop 250 will suddenly jump to Logic 1. When that occurs, the output of OR-gate 252 will drive a Logic 1 into AND-gate 254, and its output will jump to Logic 1, thereby driving the D input of flip-flop 256 to Logic 1. Upon a positive transition of the SC clock, the Q of output flip-flop 256 will jump to a Logic 1 state at signal path 52, which represents the variable CC that informs microprocessor 70 that the calibration procedure is now complete. This CC signal is also fed back to an input of OR-gate 252, which latches the Q output of flip-flop 256 to a Logic 1 value until the calibration mode is ended. The result of the calibration procedure is also stored in the CRR register (see 54 on FIG. 1), for future reference by microprocessor 70.

Figure 4:
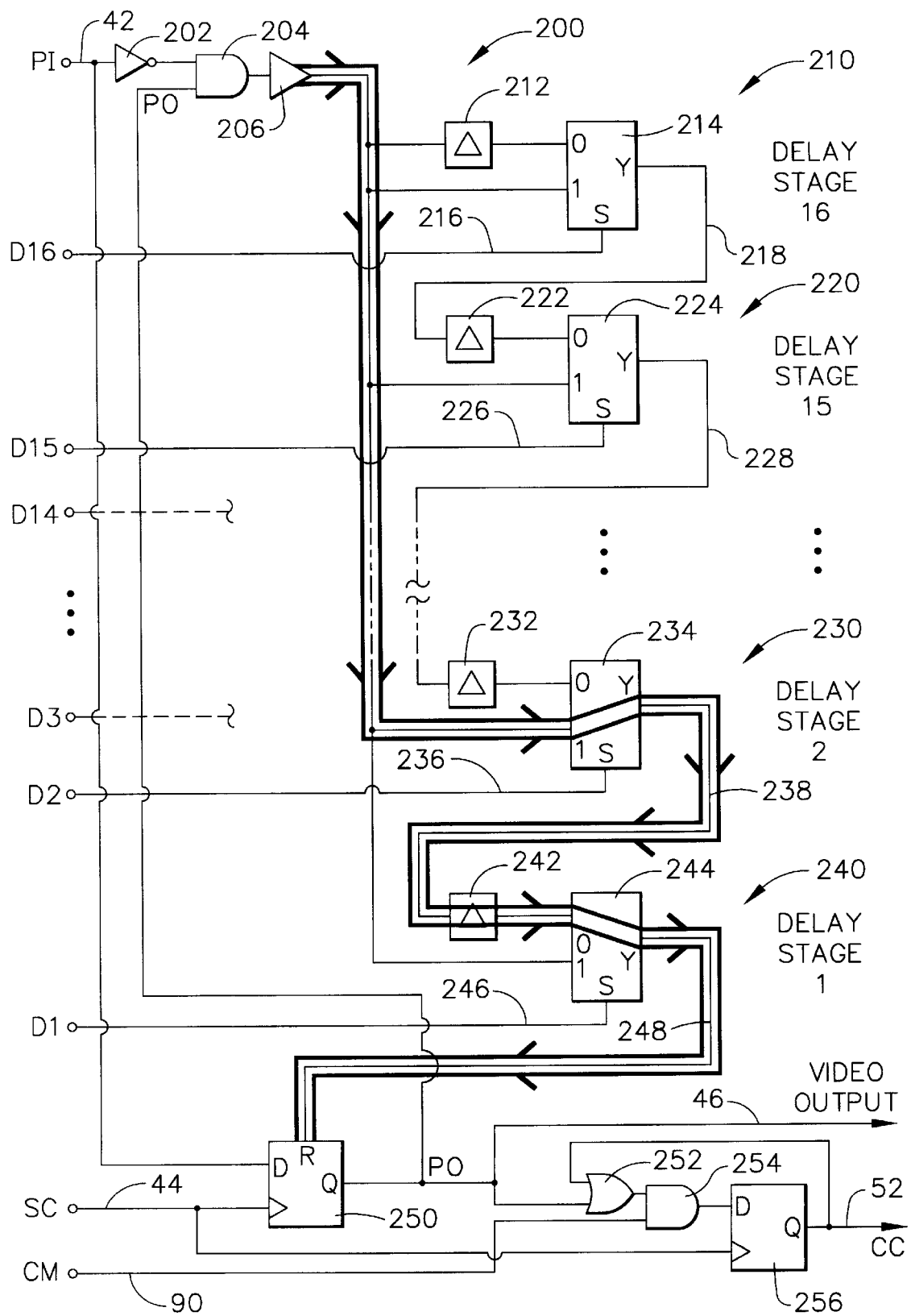
FIG. 4 is a block diagram in partial schematic of the electronic circuit disclosed in FIG. 3, showing the exact path traveled by a pulse for a particular example of a quickly truncated slice.

During a print operation, the appropriate one of the Select lines D1–D16 will be set to a Logic 1 state, while all of the other Select lines are set to Logic 0 state. For example, if a very short delay was desired, such that only a single delay stage was required to print a particular portion of a slice, then the D2 line would be set to Logic 1. The resulting pulse path is depicted in FIG. 4, in which the pulse leaves buffer 206, travels through the 1-input of multiplexer 234 to its output Y, then travels via signal path 238 to delay element 242. The pulse, after the appropriate delay time, continues to travel to the 0-input of multiplexer 244, to its output Y and along data path 248 to asynchronously reset the flip-flop 250 after a very short time interval.

It will be understood that the logic states of the signals D3–D16 really make no difference in the example depicted on FIG. 4. Regardless of the switching states of the multiplexer chips 214 and 224, as well as the other multiplexers that are not shown on FIG. 4, but are included in the delay line chain 200, the status of multiplexer 234 will not be affected, since multiplexer 234 has its output Y switched to its 1-input, rather than its 0-input. Therefore, regardless of the state of the output of delay element 232, the output on signal path 248 will be delayed by a single delay element (i.e., delay element 242).

It will be understood that the Select Lines D1–D16 on FIG. 3 essentially perform the same functions as both the "CT" and "PT" signals on FIG. 1, which command the switching operations of Master MUX 80.

One major advantage of the second embodiment shown in FIG. 3 over the first embodiment of FIG. 2 is that a very short delay interval can be achieved by using the relatively "fast" multiplexers having the dual-inputs. The Master MUX 80 shown in FIG. 2 has a relatively slow response time, since there is much more circuitry for the pulse to travel through within that multiplexer integrated circuit, especially since it has the capability of switching sixteen (16) different inputs. The situation would be exacerbated if even more than sixteen delay elements were to be switched by a multiplexer connected according to FIG. 2.

In the circuit of FIG. 3, it makes no difference whether a small number or a large number of delay stages are used, since a very short time delay pulse can be generated simply by switching the signals as shown in FIG. 4. To achieve a longer time delay pulse, (i.e., to achieve a larger percentage of a slice to be printed), then one of the other delay stage select lines would be chosen by microprocessor 70, and more delay elements would be connected in series before emitting a pulse by the final multiplexer 244.

It will be understood that other circuit arrangements could easily be implemented without departing from the principles of the present invention to achieve and calibrate the desired time delays using analog delay lines to further subdivide a slice clock pulse. For example, the additional portion of a slice could be added just before a full slice, rather than just after that slice, by changing a few locations of the signals. In one example, on FIG. 2 the flip-flop 100 could have the output pulse from Master MUX 80 communicated to the flip-flop's "Set" input instead of to its "Reset" input (as depicted on FIG. 2). This would need to be an asynchronous Set input to achieve the principles of the present invention. In addition, the input signal to the delay line chain at L0 would be derived from the PI signal at 42, rather than the PO signal at 46. The logic to choose the number of delay stages would also be reversed in this scenario. The same type of circuit alterations could be easily applied to the second embodiment depicted on FIG. 3.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined be the claims appended hereto.

We claim:

1. In a computer system having a memory circuit for storing image data, a system clock for synchronizing the communicating of the image data to an image output device, and a delay line circuit for creating logic state transitions at intervals other than according to the system clock, a method of calibrating a delay line circuit, said method comprising the steps of:

(a) initially sending an electrical signal into at least one of a plurality of in-series delay line elements, each of said delay line elements having an output that is communicated to a selecting circuit;

(b) providing a system clock signal to said selecting circuit;

(c) upon reaching the end of one entire period of said system clock signal, determining how many of said plurality of in-series delay line elements has undergone a logic transition, and creating a "contone variable" having a numeric value equal to {number of delay line elements per system clock cycle}, thereby calibrating said plurality of in-series delay line elements in units of {number of delay line elements per system clock cycle}; and (d) using said contone variable to create at least one "density signal" having a logic state transition that occurs at times other than at a transition of said system clock.

2. The method as recited in claim 1, wherein said selecting circuit creates at least one Truncate Select signal that is directed to a multi-input multiplexer that receives said output from each of said delay line elements, and an output from said multi-input multiplexer is directed to an asynchronously resetable flip-flop that outputs a serialized signal that is communicated to said image output device.

3. The method as recited in claim 2, wherein the step of determining how many in-series delay line elements has undergone a logic transition comprises a Calibrate Mode, and said Truncate Select signal comprises a Calibrate Truncate Select signal that selects which one of the inputs of said multi-input multiplexer is connected to the output of said multi-input multiplexer during a calibration procedure, said Calibrate Truncate Select signal initially selecting a first of said inputs, then incrementing through all of said inputs until said contone variable is determined for this particular calibration procedure.

4. The method as recited in claim 3, further comprising a normal Output Mode that follows said Calibrate Mode, wherein said Truncate Select signal comprises an Output Truncation Select signal that selects which one of the inputs of said multi-input multiplexer is connected to the output of said multi-input multiplexer during said Output Mode, and said density signal corresponds to the selected one of the inputs of said multi-input multiplexer.

5. The method as recited in claim 1, wherein said selecting circuit creates at least one Stage Select signal that is directed to a plurality of delay stages, each delay stage comprising one of said delay line elements and a dual-input multiplexer, each succeeding delay stage having an input to its delay line element communicated from an output of the preceding stage's dual-input multiplexer, each of said dual-input multiplexers having a Select input that is in communication with said at least one Stage Select signal, and wherein the final of said plurality of delay stages directs an output from its dual-input multiplexer to an asynchronously resetable flip-flop that outputs a serialized signal that is communicated to said image output device.

6. The method as recited in claim 5, wherein the step of determining how many in-series delay line elements has undergone a logic transition comprises a Calibrate Mode, and said Stage Select signal comprises a plurality of command signal paths that determine which of said dual-input multiplexers have delayed inputs or non-delayed inputs switched to their outputs; and during a calibration procedure, said Stage Select signal initially selecting a first of said delayed and non-delayed inputs, then incrementing through all of said delayed and non-delayed inputs until said contone variable is determined for this particular calibration procedure.

7. The method as recited in claim 6, further comprising a normal Output Mode that follows said Calibrate Mode, wherein said Stage Select signal determines which of said dual-input multiplexers have delayed inputs or non-delayed inputs switched to their outputs during said Output Mode, and said density signal corresponds to the selected of said delayed and non-delayed inputs.

8. In a printing system having a memory circuit for storing image data, a system clock for synchronizing the communicating of the image data to a print engine, and a delay line circuit for creating logic state transitions at intervals other than according to the system clock, a method of creating continuous tones of image data by the print engine, said method comprising the steps of:

(a) periodically calibrating a delay line circuit, by:
  (i) initially sending an electrical signal into at least one of a plurality of in-series delay line elements, each of said delay line elements having an output that is communicated to a selecting circuit;
  (ii) providing a system clock signal to said selecting circuit;
  (iii) upon reaching the end of one entire period of said system clock signal, determining how many of said plurality of in-series delay line elements has undergone a logic transition, and creating a "contone variable" having a numeric value equal to {number of delay line elements per system clock cycle}, thereby calibrating said plurality of in-series delay line elements in units of {number of delay line elements per system clock cycle}; and
  (iv) using said contone variable to create at least one "density signal" having a logic state transition that occurs at times other than at a transition of said system clock;

(b) retrieving at least one pel of image data from said memory circuit and determining its desired continuous tone value;

(c) comparing said pel's desired continuous tone value to said contone variable's present value and choosing the appropriate "density signal" that most nearly approximates said pel's desired continuous tone value; and (d) communicating said appropriate density signal to said print engine so as to output a physical dot that approximates the pel's desired continuous tone value.

9. The method as recited in claim 8, wherein said selecting circuit creates at least one Truncate Select signal that is directed to a multi-input multiplexer that receives said output from each of said delay line elements, and an output from said multi-input multiplexer is directed to an asynchronously resetable flip-flop that outputs a serialized signal that is conmmunicated to said print engine.

10. The method as recited in claim 9, wherein the step to determining how many in-series delay line elements has undergone a logic transition comprises a Calibrate Mode, and said Truncate select signal comprises a Calibrate Truncate Select signal that selects which one of the inputs of said multi-input multiplexer is connected to the output of said multi-input multiplexer during a calibration procedure, said Calibrate Truncate Select signal initially selecting a first of said inputs, then incrementing through all of said inputs until said contone variable is determined for this particular calibration procedure.

11. The method as recited in claim 10, further comprising a normal Print Mode that follows said Calibrate Mode, wherein said Truncate Select signal comprises a Print Truncation Select signal that selects which one of the inputs of said multi-input multiplexer is connected to the output of said multi-input multiplexer during said Print Mode, and said density signal corresponds to the selected one of the inputs of said multi-input multiplexer.

12. The method as recited in claim 8, wherein said selecting circuit creates at least one Stage Select signal that is directed to a plurality of delay stages, each delay stage comprising one of said delay line elements and a dual-input multiplexer, each succeeding delay stage having an input to its delay line element communicated from an output of the preceding stage's dual-input multiplexer, each of said dual-input multiplexers having a Select input that is in communication with said at least one Stage Select signal, and wherein the final of said plurality of delay stages directs an output from its dual-input multiplexer to an asynchronously resetable flip-flop that outputs a serialized signal that is communicated to said print engine.

13. The method as recited in claim 12, wherein the step of determining how many in-series delay line elements has undergone a logic transition comprises a Calibrate Mode, and said Stage Select signal comprises a plurality of command signal paths that determine which of said dual-input multiplexers have delayed inputs or non-delayed inputs switched to their outputs, and during a calibration procedure, said Stage Select signal initially selecting a first of said delayed and non-delayed inputs, then incrementing through all of said delayed and non-delayed inputs until said contone variable is determined for this particular calibration procedure.

14. The method as recited in claim 13, further comprising a normal Print Mode that follows said Calibrate Mode, wherein said Stage Select signal determines which of said dual-input multiplexers have delayed inputs or non-delayed inputs switched to their outputs during said Print Mode, and said density signal corresponds to the selected of said delayed and non-delayed inputs.

15. The method as recited in claim 8, wherein said system clock is a slice clock that subdivides a pel clock, and a logic state transition of said density signal occurs between logic state transitions of said slice clock.

16. A laser printer having a processing circuit, a memory circuit for storing image data, and a print engine, said laser printer comprising:

(a) a print engine that includes a plurality of in-series delay line elements, each of said delay line elements being in communication with a selecting circuit;

(b) a system clock used in synchronizing the communicating of image data to said print engine, said system clock being communicated to said selecting circuit;

(c) a processing circuit that is configured to calibrate said delay line elements by determining how many of said plurality of in-series delay line elements has undergone a logic transition upon reaching the end of one entire period of said system clock signal, and creating a "contone variable" having a numeric value equal to {number of delay line elements per system clock cycle}, thereby calibrating said plurality of in-series delay line elements in units of {number of delay line elements per system clock cycle}; and (d) said processing circuit being further configured to create at least one "density signal" by using said contone variable, said density signal having a logic state transition that occurs at times other than at a transition of said system clock.

17. The laser printer as recited in claim 16, wherein said processing circuit is yet further configured to retrieve at least one pel of image data from said memory circuit and determining its desired continuous tone value, compare said pel's desired continuous tone value to said contone variable's present value and choose the appropriate "density signal" that most nearly approximates said pel's desired continuous tone value; and communicate said appropriate density signal to said print engine so as to output a physical dot that approximates the pel's desired continuous tone value.

18. The laser printer as recited in claim 16, wherein said selecting circuit creates at least one Truncate Select signal that is directed to a multi-input multiplexer that receives said output from each of said delay line elements, and an output from said multi-input multiplexer is directed to an asynchronously resetable flip-flop that outputs a serialized signal that is communicated to said print engine.

19. The laser printer as recited in claim 18, wherein said calibration of the delay line elements comprises a Calibrate Mode, and said Truncate Select signal comprises a Calibrate Truncate Select signal that selects which one of the inputs of said multi-input multiplexer is connected to the output of said multi-input multiplexer during a calibration procedure, said Calibrate Truncate Select signal initially selecting a first of said inputs, then incrementing through all of said inputs until said contone variable is determined for this particular calibration procedure.

20. The laser printer as recited in claim 19, wherein a normal Print Mode follows said Calibrate Mode, and said Truncate Select signal comprises a Print Truncation Select signal that selects which one of the inputs of said multi-input multiplexer is connected to the output of said multi-input multiplexer during said Print Mode, and said density signal corresponds to the selected one of the inputs of said multi-input multiplexer.

21. The laser printer as recited in claim 16, wherein said selecting circuit creates at least one Stage Select signal that is directed to a plurality of delay stages, each delay stage comprising one of said delay line elements and a dual-input multiplexer, each succeeding delay stage having an input to its delay line element communicated from an output of the preceding stage's dual-input multiplexer, each of said dual-input multiplexers having a Select input that is in communication with said at least one Stage Select signal, and wherein the final of said plurality of delay stages directs an output from its dual-input multiplexer to an asynchronously resetable flip-flop that outputs a serialized signal that is communicated to said print engine.

22. The laser printer as recited in claim 21, wherein said calibration of the delay line elements comprises a Calibrate Mode, and said Stage Select signal comprises a plurality of command signal paths that determine which of said dual-input multiplexers have delayed inputs or non-delayed inputs switched to their outputs; and during a calibration procedure, said Stage Select signal initially selecting a first of said delayed and non-delayed inputs, then incrementing through all of said delayed and non-delayed inputs until said contone variable is determined for this particular calibration procedure.

23. The laser printer as recited in claim 22, further comprising a normal Print Mode that follows said Calibrate Mode, wherein said Stage Select signal determines which of said dual-input multiplexers have delayed inputs or non-delayed inputs switched to their outputs during said Print Mode, and said density signal corresponds to the selected of said delayed and non-delayed inputs.

24. The laser printer as recited in claim 16, wherein said system clock is a slice clock that subdivides a pel clock, and a logic state transition of said density signal occurs between logic state transitions of said slice clock.

25. The laser printer as recited in claim 16, wherein said delay line elements are all contained within an ASIC as part of said print engine.

26. A laser printer having a processing circuit, a memory circuit for storing image data, and a print engine, said laser printer comprising:
(a) a print engine that includes a plurality of in-series delay line elements, each of said delay line elements being in communication with a selecting circuit, said plurality of in-series delay line elements being contained within an ASIC;
(b) a system clock used in synchronizing the communicating of image data to said print engine, said system clock being communicated to said selecting circuit;
(c) a processing circuit that is configured to calibrate said delay line elements by determining how many of said plurality of in-series delay line elements has undergone a logic transition upon reaching the end of one entire period of said system clock signal, and creating a "contone variable" having a numeric value equal to {number of delay line elements per system clock cycle}; and
(d) said processing circuit being further configured to create at least one "density signal" by using said contone variable, said density signal having a logic state transition that occurs at times other than at a transition of said system clock.

27. In a computer system having a memory circuit for storing image data, a system clock for synchronizing the communicating of the image data to an image output device, and a delay line circuit for creating logic state transitions at intervals other than according to the system clock, a method of calibrating a delay line circuit, said method comprising the steps of:
(a) initially sending an electrical signal into at least one of a plurality of in-series delay line elements, each of said delay line elements having an output that is communicated to a selecting circuit, said plurality of in-series delay line elements being contained within an ASIC;
(b) providing a system clock signal to said selecting circuit;
(c) upon reaching the end of one entire period of said system clock signal, determining how many of said plurality of in-series delay line elements has undergone a logic transition, and creating a "contone variable" having a numeric value equal to {number of delay line elements per system clock cycle}; and
(d) using said contone variable to create at least one "density signal" having a logic state transition that occurs at times other than at a transition of said system clock.

28. In a printing system having a memory circuit for storing image data, a system clock for synchronizing the communicating of the image data to a print engine, and a delay line circuit for creating logic state transitions at intervals other than according to the system clock, a method of creating continuous tones of image data by the print engine, said method comprising the steps of:
(a) periodically calibrating a delay line circuit, by:
(i) initially sending an electrical signal into at least one of a plurality of in-series delay line elements, each of said delay line elements having an output that is communicated to a selecting circuit, said plurality of in-series delay line elements being contained within an ASIC;

(ii) providing a system clock signal to said selecting circuit;

(iii) upon reaching the end of one entire period of said system clock signal, determining how many of said plurality of in-series delay line elements has undergone a logic transition, and creating a "contone variable" having a numeric value equal to {number of delay line elements per system clock cycle}; and (iv) using said contone variable to create at least one "density signal" having a logic state transition that occurs at times other than at a transition of said system clock;

(b) retrieving at least one pel of image data from said memory circuit and determining its desired continuous tone value;

(c) comparing said pel's desired continuous tone value to said contone variable's present value and choosing the appropriate "density signal" that most nearly approximates said pel's desired continuous tone value; and (d) communicating said appropriate density signal to said print engine so as to output a physical dot that approximates the pel's desired continuous tone value.

* * * * *